United States Patent
Yamanaka et al.

(10) Patent No.: US 10,839,526 B2
(45) Date of Patent: Nov. 17, 2020

(54) INFORMATION PROCESSING DEVICE, INFORMATION PROCESSING METHOD, AND RECORDING MEDIUM

(71) Applicant: FUJITSU LIMITED, Kawasaki (JP)

(72) Inventors: Ryosuke Yamanaka, Kawasaki (JP); Mitsuru Tomono, Higashimurayama (JP); Satoshi Tanabe, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 16/408,509

(22) Filed: May 10, 2019

(65) Prior Publication Data

US 2019/0266734 A1 Aug. 29, 2019

Related U.S. Application Data

(63) Continuation of application No. PCT/JP2016/083728, filed on Nov. 14, 2016.

(51) Int. Cl.
*G06T 7/246* (2017.01)
*G06T 7/50* (2017.01)
(Continued)

(52) U.S. Cl.
CPC ............... *G06T 7/246* (2017.01); *G06T 7/00* (2013.01); *G06T 7/50* (2017.01); *G06T 7/60* (2013.01);
(Continued)

(58) Field of Classification Search
CPC .. G06T 7/246; G06T 7/50; G06T 7/90; G06T 7/00; G06T 7/60; G06T 2207/20084; G06T 2207/30196
See application file for complete search history.

(56) References Cited

U.S. PATENT DOCUMENTS 9,870,622 B1 * 1/2018 Lu ........................... G16H 20/30
10,380,759 B2 * 8/2019 Shiozaki ................... G06T 7/75
(Continued)

FOREIGN PATENT DOCUMENTS

JP  2000-251078  9/2000
JP  2008-65368   3/2008
(Continued)

OTHER PUBLICATIONS

Wei Yang et al., "End-to-End Learning of Deformable Mixture of Parts and Deep Convolutional Neural Networks for Human Pose Estimation", CVPR2016 (10 pages)/.
(Continued)

*Primary Examiner* — Utpal D Shah
(74) *Attorney, Agent, or Firm* — Fujitsu Patent Center

(57) ABSTRACT

An information processing device includes: a memory; and a processor coupled to the memory and configured to: estimate a first position of a first joint in a two-dimensional plane based on a color image, and estimate a first positional relationship between the first joint and a second joint coupled to the first joint via a portion in the two-dimensional plane; estimate a second position of the first joint in the two-dimensional plane based on a depth image indicating respective depths of the first joint and the second joint, and estimate a second positional relationship between the first joint and the second joint in a three-dimensional space; and estimate a third position of the first joint in the two-dimensional plane and posture of the portion in the three-dimensional space based on the first position, the first positional relationship the second position, and the second positional relationship.

9 Claims, 22 Drawing Sheets

(51) Int. Cl.
  *G06T 7/90* (2017.01)
  *G06T 7/60* (2017.01)
  *G06T 7/00* (2017.01)

(52) U.S. Cl.
  CPC ...... *G06T 7/90* (2017.01); *G06T 2207/20084* (2013.01); *G06T 2207/30196* (2013.01)

(56) References Cited

U.S. PATENT DOCUMENTS

| | | | |
|---|---|---|---|
| 2007/0126743 A1* | 6/2007 | Park | G06T 7/74 |
| | | | 345/474 |
| 2011/0267344 A1 | 11/2011 | Germann et al. | |
| 2012/0056800 A1* | 3/2012 | Williams | G06K 9/00369 |
| | | | 345/156 |
| 2012/0327089 A1 | 12/2012 | Lee et al. | |
| 2013/0230211 A1* | 9/2013 | Tanabiki | G06T 7/75 |
| | | | 382/103 |
| 2013/0271458 A1* | 10/2013 | Andriluka | G06T 7/55 |
| | | | 345/420 |
| 2015/0036879 A1* | 2/2015 | Shiozaki | G06T 7/75 |
| | | | 382/103 |
| 2015/0310629 A1 | 10/2015 | Utsunomiya et al. | |
| 2017/0344829 A1* | 11/2017 | Lan | G06K 9/00369 |
| 2018/0024641 A1* | 1/2018 | Mao | G06K 9/00389 |
| | | | 382/103 |

FOREIGN PATENT DOCUMENTS

| | | |
|---|---|---|
| JP | 2011-238222 | 11/2011 |
| JP | 2014-522018 | 8/2014 |
| JP | 2015-061577 | 4/2015 |
| JP | 2015-167008 | 9/2015 |
| WO | 2012/046392 | 4/2012 |
| WO | 2012/177643 | 12/2012 |

OTHER PUBLICATIONS

International Search Report, mailed in connection with PCT/JP2016/083728 and dated Dec. 6, 2016 (2 pages).

* cited by examiner

COLOR IMAGE

DEPTH IMAGE

FIG. 16

| $x_{ij}$ | $y_{ij}$ | $z_{ij}$ | JOINT TYPE |
|---|---|---|---|
| POSITIVE | POSITIVE | POSITIVE | TYPE 1 |
| POSITIVE | POSITIVE | NEGATIVE | TYPE 2 |
| POSITIVE | NEGATIVE | POSITIVE | TYPE 3 |
| POSITIVE | NEGATIVE | NEGATIVE | TYPE 4 |
| NEGATIVE | POSITIVE | POSITIVE | TYPE 5 |
| NEGATIVE | POSITIVE | NEGATIVE | TYPE 6 |
| NEGATIVE | NEGATIVE | POSITIVE | TYPE 7 |
| NEGATIVE | NEGATIVE | NEGATIVE | TYPE 8 |

INFORMATION PROCESSING DEVICE, INFORMATION PROCESSING METHOD, AND RECORDING MEDIUM

CROSS-REFERENCE TO RELATED APPLICATION

This application is a continuation application of International Application PCT/JP2016/083728 filed on Nov. 14, 2016 and designated the U.S., the entire contents of which are incorporated herein by reference.

FIELD

The embodiment discussed herein is related to an information processing device, an information processing method, and a recording medium.

BACKGROUND

Posture estimation of a human body using captured images can be utilized in automatic scoring of gymnastics and dance, and motion analysis of athletes.

Japanese Laid-open Patent Publication No. 2008-65368, Japanese Laid-open Patent Publication No. 2015-167008, Japanese Laid-open Patent Publication No. 2011-238222, International Publication Pamphlet No. WO 2012/046392, and Wei Yang and 3 others, "End-to-End Learning of Deformable Mixture of Parts and Deep Convolutional Neural Networks for Human Pose Estimation", CVPR 2016 are disclosed as related art.

SUMMARY

According to an aspect of the embodiments, an information processing device includes: a memory; and a processor coupled to the memory and configured to: estimate a first position of a first joint in a two-dimensional plane based on a color image, and estimate a first positional relationship between the first joint and a second joint coupled to the first joint via a portion in the two-dimensional plane; estimate a second position of the first joint in the two-dimensional plane based on a depth image indicating respective depths of the first joint and the second joint, and estimate a second positional relationship between the first joint and the second joint in a three-dimensional space; and estimate a third position of the first joint in the two-dimensional plane and posture of the portion in the three-dimensional space based on the first position, the first positional relationship the second position, and the second positional relationship.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating a three-dimensional joint type pattern;

DESCRIPTION OF EMBODIMENTS

For example, the position and the posture of an object is recognized without performing corresponding point search, which increases calculation cost and can not completely avoid erroneous recognition. For example, posture estimation methods are provided.

For example, the positions of joints in the depth direction are not taken into consideration. Thus, the posture of hands, feet, and the like with respect to the depth direction is unknown, and accurate estimation of the posture of a human body may be difficult.

The disclosure may be directed to estimation of the position of a joint and the posture of a part connected to the joint.

Hereinafter, embodiments will be described with reference to the drawings.

Figure 1:
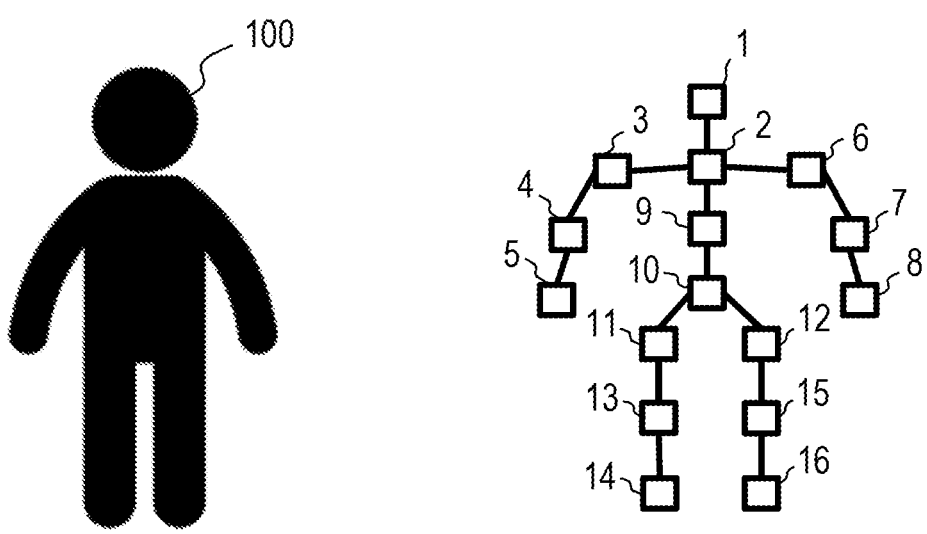
FIG. 1 is a diagram for describing modeling of a human body.

FIG. 1 is a diagram for describing modeling of a human body.

In modeling a human body 100 illustrated in the left part of FIG. 1, a plurality of joints, parts such as the head, hands, feet, and the like of the human body 100 are defined as "points", and parts such as limbs and the torso that connect the joints and parts expressed as "points" are expressed as "sides" as illustrated in the right part of FIG. 1.

The Joints and the parts expressed as "points" when modeling the human body include, for example, a head 1, a neck 2, a left shoulder (shoulder_left) 3, a left elbow (elbow_left) 4, a left hand (hand_left) 5, a right shoulder (shoulder_right) 6, a right elbow (elbow_right) 7, a right hand (hand_right) 8, a middle spine (spine_mid) 9, a base spine (spine_base) 10, a left hip (hip_left) 11, a right hip (hip_right) 12, a left knee (knee_left) 13, a left foot (foot_left) 14, a right knee (knee_right) 15, and a right foot (foot_right) 16. Hereinafter, parts expressed as "points" such as the head, the hands, and the feet may be sometimes expressed as being included in joints.

Figure 2:
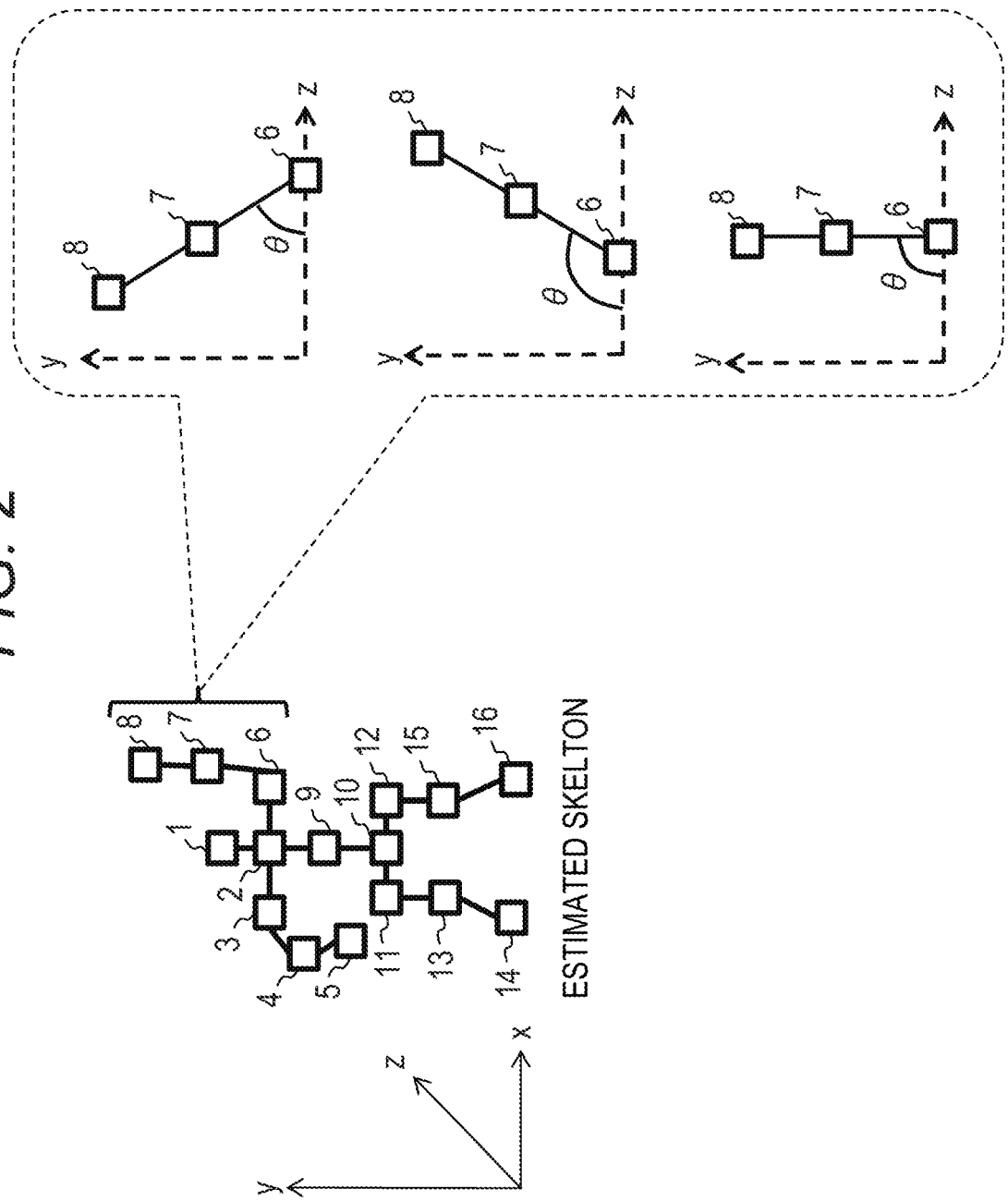
FIG. 2 is a diagram illustrating an estimated skeleton.

FIG. 2 is a diagram illustrating an estimated skeleton.

It is assumed here that the position of each joint is estimated by the conventional posture estimation method and the skeleton as illustrated in FIG. 2 is estimated. In the conventional posture estimation method, however, there is no information in the depth direction (Z direction). Thus, it is difficult to determine, for example, whether the right elbow 7 and the right hand 8 are located in front of the right shoulder 6, right above the right shoulder 6, or back side of the right shoulder 6 as illustrated in the right part of FIG. 2. Therefore, the conventional method is disadvantageous in that it is difficult to accurately estimate the posture.

Figure 3:
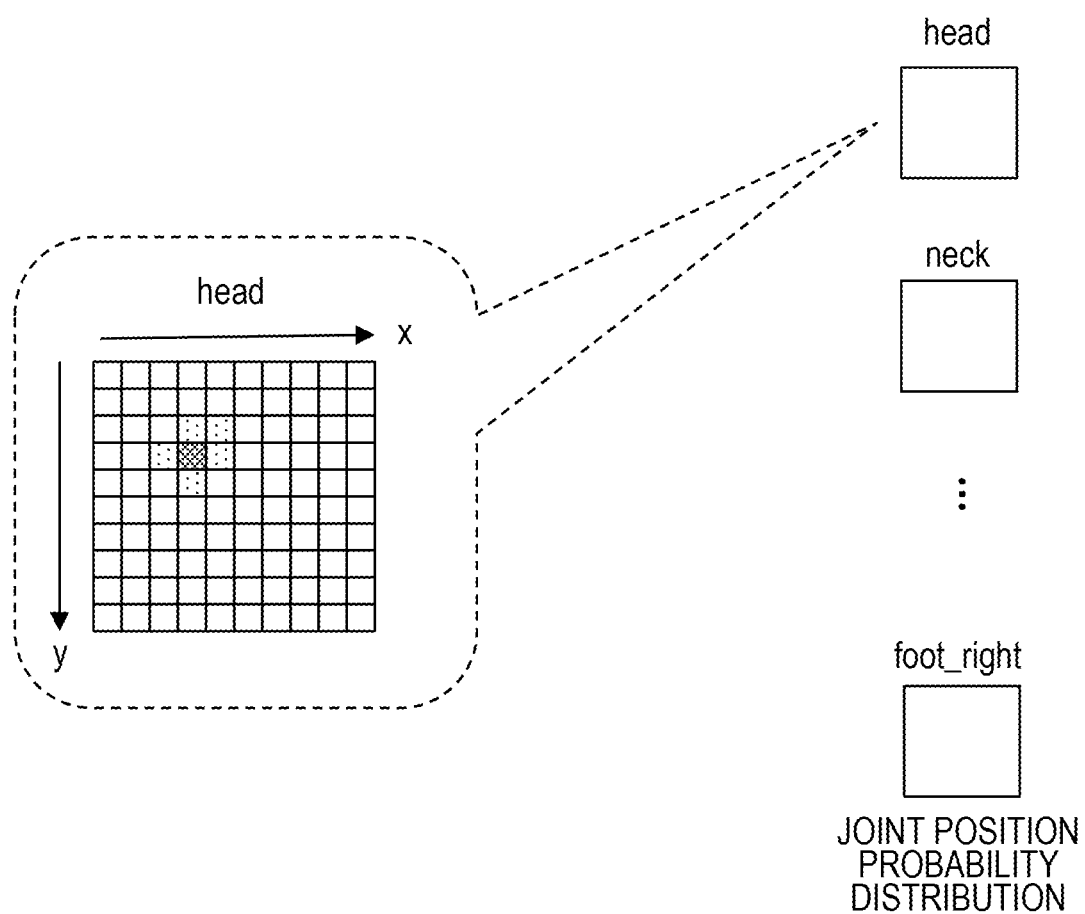
FIG. 3 is a diagram for describing the probability distribution of joint positions.

FIG. 3 is a diagram for describing the probability distribution of joint positions.

In a posture estimation method according to an embodiment, the probability distribution (joint position probability distribution) of the position of a certain joint can be expressed by a heat map illustrating the probability that the joint is present in each area of an image.

For example, in a heat map for the position of the head illustrated in the left part of FIG. 3, the higher the probability that the head is present in the area, the darker the color of the area is expressed. Similarly, the probability distribution of each of the positions of other joints such as the neck and the left shoulder can also be expressed by a heat map.

Figure 4:
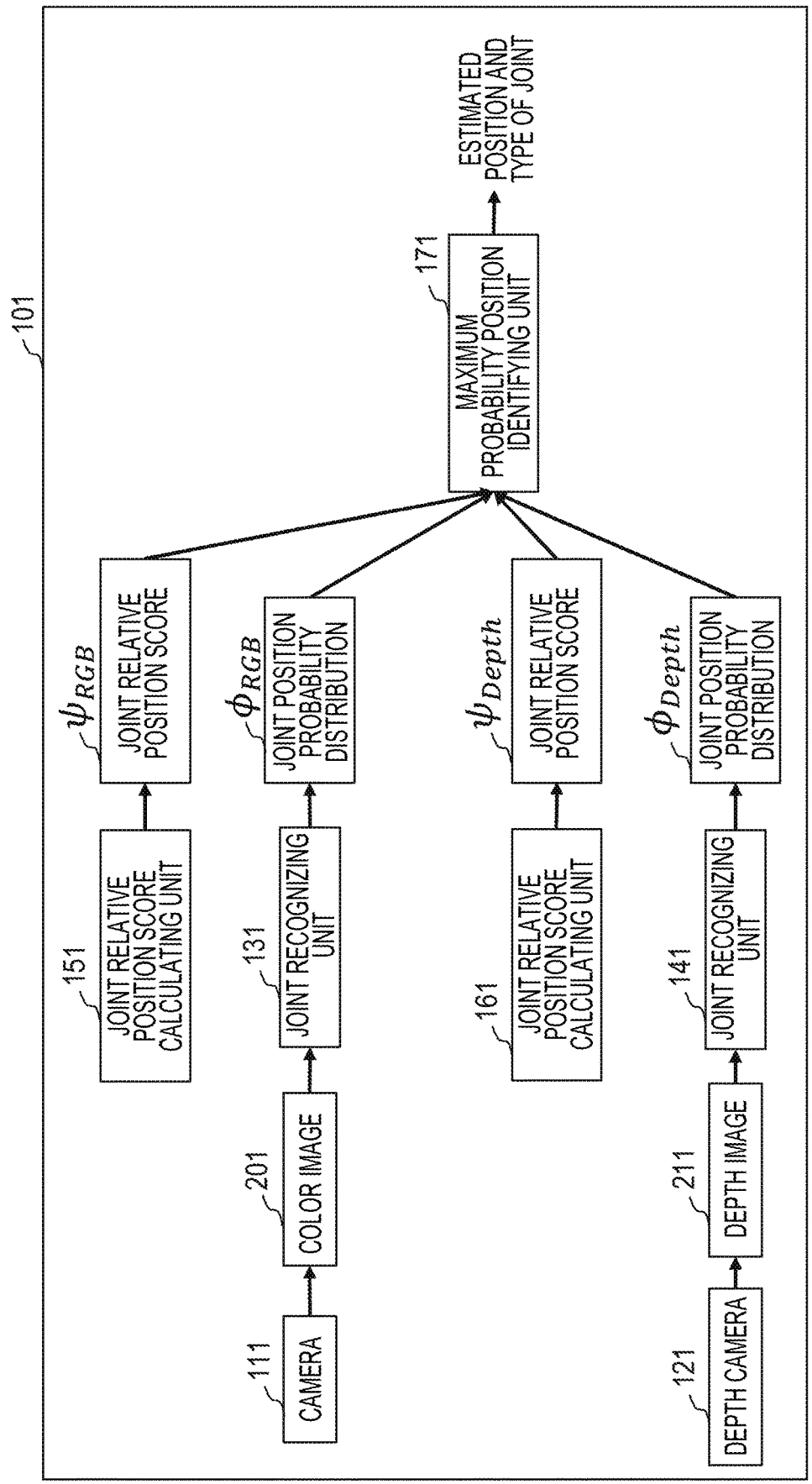
FIG. 4 is a functional block diagram of a posture estimating device according to an embodiment.

FIG. 4 is a functional block diagram of a posture estimating device according to the embodiment.

The posture estimating device 101 includes a camera 111, a depth camera 121, joint recognizing units 131 and 141, joint relative position score calculating units 151 and 161, and a maximum probability position identifying unit 171.

Figure 5:
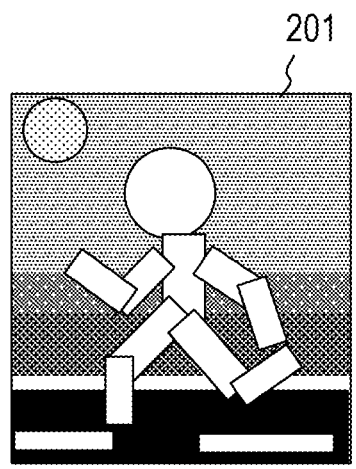
FIG. 5 is an example of a color image.

The camera 111 captures an image of a predetermined area, generates a color image 201 of a subject (for example, a human body), and outputs the color image 201 to the joint recognizing unit 131. The camera 111 captures a color image 201 as illustrated in FIG. 5, for example.

Figure 6:
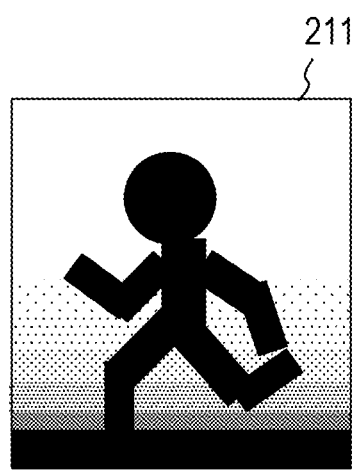
FIG. 6 is an example of a depth image.

The depth camera 121 captures an image of a predetermined area at the same timing as the camera 111, generates a depth image 211 indicating distances from the depth camera 121 to the subject as pixel values, and outputs the depth image 211 to the joint recognizing unit 141. The depth camera 121 captures the depth image 211 as illustrated in FIG. 6, for example. In the depth image 211, as a distance from the depth camera 121 to the subject increases, the corresponding pixel becomes closer to white (pixel value increases), and as the distance from the depth camera 121 to the subject decreases, the pixel becomes closer to black (pixel value decreases).

The joint recognizing unit 131 calculates the joint position probability distribution $\phi_{RGB}$ indicating the presence probability of each joint in each area of a two-dimensional plane for each two-dimensional joint type using the color image 201.

The joint recognizing unit 141 calculates the joint position probability distribution $\phi_{Depth}$ of each joint indicating the presence probability of each joint in each area of the two-dimensional plane for each three-dimensional joint type using the depth image 211.

The joint relative position score calculating unit 151 calculates the score (joint relative position score $\psi_{RGB}$) of each joint for each two-dimensional joint type in each area of the two-dimensional plane, and outputs the score to the maximum probability position identifying unit 171. The joint relative position score calculating unit 151 is not essential. When the joint relative position score calculating unit 151 is not provided, the joint relative position score $\psi_{RGB}$ may be calculated outside in advance, input to the posture estimating device 101, stored in a storage (not illustrated), and appropriately read by the maximum probability position identifying unit 171.

The joint relative position score calculating unit 161 calculates the score (joint relative position score $\psi_{Depth}$) in each area of the two-dimensional plane of each joint for each three-dimensional joint type, and outputs the score to the maximum probability position identifying unit 171. The joint relative position score calculating unit 161 is not essential. When the joint relative position score calculating unit 161 is not provided, the joint relative position score $\psi_{Depth}$ may be calculated outside in advance, input to the posture estimating device 101, stored in a storage (not illustrated), and appropriately read by the maximum probability position identifying unit 171.

Based on the joint relative position score $\psi_{RGB}$, the joint position probability distribution $\phi_{RGB}$, the joint relative position score $\psi_{Depth}$, and the joint position probability distribution $\phi_{Depth}$, the maximum probability position identifying unit 171 identifies the position and type of the maximum probability for each joint and outputs the identified joint position and type for each joint.

Next, processing of the joint recognizing unit 131 will be described.

Figure 7:
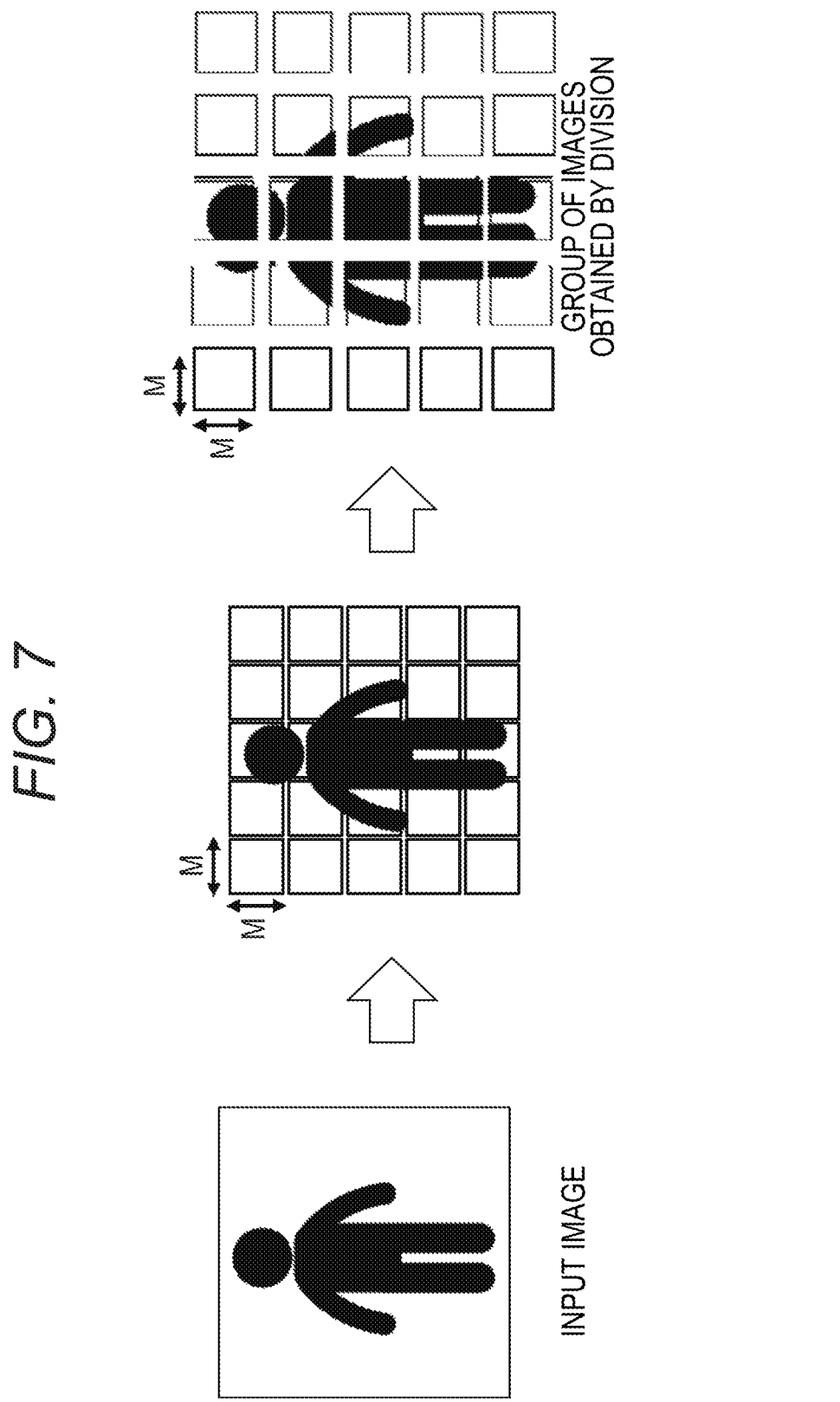
FIG. 7 is a diagram illustrating division of an input image.

FIG. 7 is a diagram illustrating division of an input image.

The joint recognizing unit 131 divides the input image (color image 201) into a plurality of images (blocks) each including M pixels in the horizontal direction and M pixels in the vertical direction. The joint recognizing unit 131 calculates, for each block, the probability that each joint of each joint type is present in the block using template matching or a Deep Convolutional Neural Network (DCNN).

Figure 8:
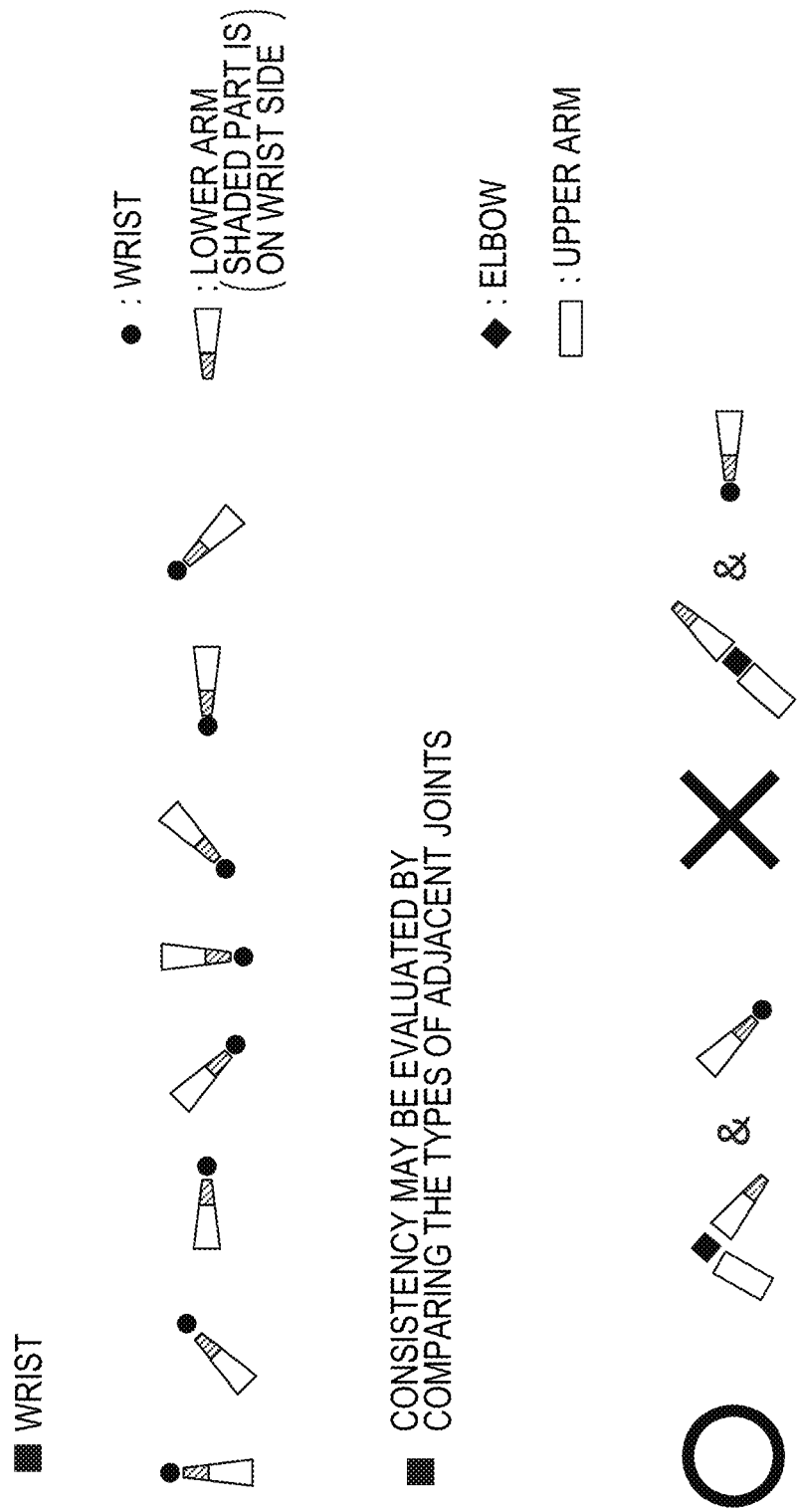
FIG. 8 is a diagram for describing joint types.

FIG. 8 is a diagram for describing joint types.

Joint types are obtained by classifying each joint into types depending on appearance of connection between the joint and a body part coupled to the joint.

For example, as illustrated in the upper part of FIG. 8, wrists are classified into eight types depending on appearance of connection between the wrist and the lower arm (the positional relationship with the elbow connected via the lower arm).

As illustrated in the lower part of FIG. 8, consistency can be evaluated by comparing the types of adjacent joints. Adjacent joints refer to joints coupled by the same part.

Figure 9:
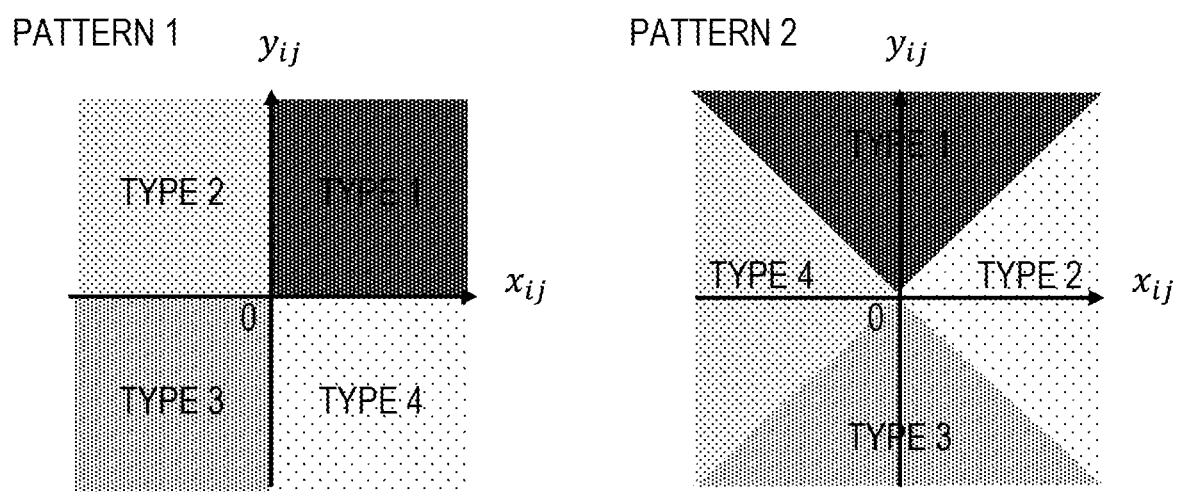
FIG. 9 is a diagram illustrating a two-dimensional joint type patterns.

FIG. 9 is a diagram illustrating a two-dimensional joint type patterns.

In detail, the two-dimensional joint types are obtained by classifying, depending on the relative position $(x_{ij}, y_{ij})$ of the joint i and a joint j adjacent to the joint i on the image, appearance of the joint i into T number of types.

When the coordinates of the joint i are defined as $(x_i, y_i)$ and the coordinates of joint j are defined as $(x_j, y_j)$, the relative position $(x_{ij}, y_{ij})$ is expressed as $(x_{ij}, y_{ij})=(x_i-x_j, y_i-y_j)$.

The number of types T and type classification (pattern) are determined by a user. For example, when T=4, type classification such as pattern 1 illustrated on the left side of FIG. 9 and pattern 2 illustrated on the right side may be used. In the coordinate plane illustrated in FIG. 9, the horizontal axis is $x_{ij}$, and the vertical axis is $y_{ij}$.

For example, in pattern 1, a joint i having $x_{ij}$ and $y_{ij}$ that are both positive values is classified into type 1. In pattern 1, a joint i having $x_{ij}$ that is a negative value, and $y_{ij}$ that is a positive value is classified into type 2. In pattern 1, a joint i having $x_{ij}$ and $y_{ij}$ that are both negative values is classified into type 3. In pattern 1, a joint i having $x_{ij}$ that is a positive value, and $y_{ij}$ that is a negative value is classified into type 4.

Figure 10:
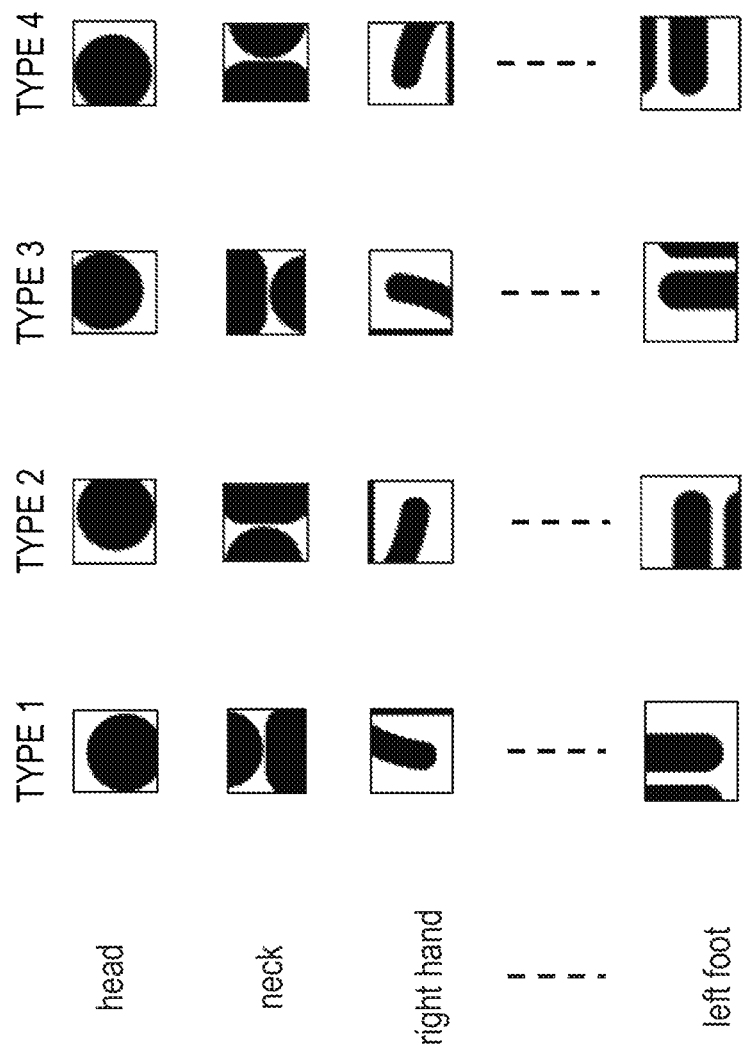
FIG. 10 is a diagram illustrating templates.

FIG. 10 is a diagram illustrating templates.

When the joint recognizing unit 131 performs template matching, a user prepares T templates for one joint, where T is the number of joint types. For example, when the number of joints is 16 and the number of joint types is 4, a user prepares 64 (=16×4) templates corresponding to all types of all joints, and stores the templates in a storage (not illustrated) in advance.

Figure 11:
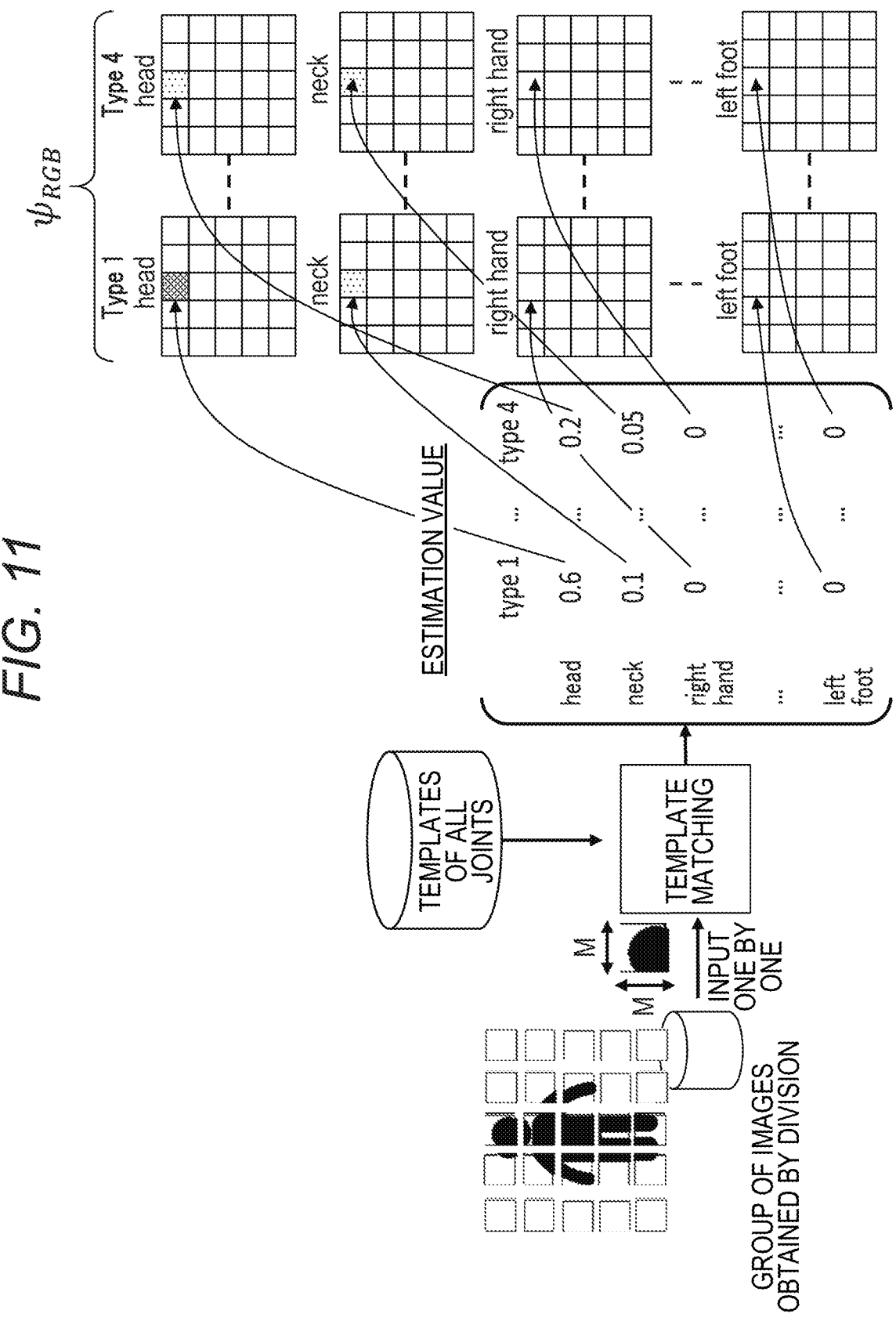
FIG. 11 is a diagram illustrating processing of template matching performed by a joint recognizing unit.

FIG. 11 is a diagram illustrating processing of template matching performed by the joint recognizing unit.

Hereinafter, processing of the template matching performed by the joint recognizing unit 131 will be described.

The joint recognizing unit 131 divides the input image (color image 201) into a plurality of images (blocks) each including M pixels in the horizontal direction and M pixels in the vertical direction. The joint recognizing unit 131 processes blocks obtained by dividing the image one by one using the template matching.

The joint recognizing unit 131 reads a plurality of templates for all types of all joints stored in a storage (not illustrated), performs template matching using the input block and the plurality of templates, and calculates an estimation value of the block with respect to each joint and each type. The calculated estimation value corresponds to the joint position probability distribution $\phi_{RGB}$. For example, when a block is input, an estimation value of the block for each type of each joint is obtained. Assuming that a certain block is input and 0.6 is obtained as the estimation value for joint=head and type T=1, it indicates that the probability that a head of type T=1 is present in the block is 0.6. Thereafter, estimation values are calculated similarly for other blocks.

Next, a DCNN will be described. The joint recognizing unit 131 may calculate the estimation value using a DCNN.

Figure 12:
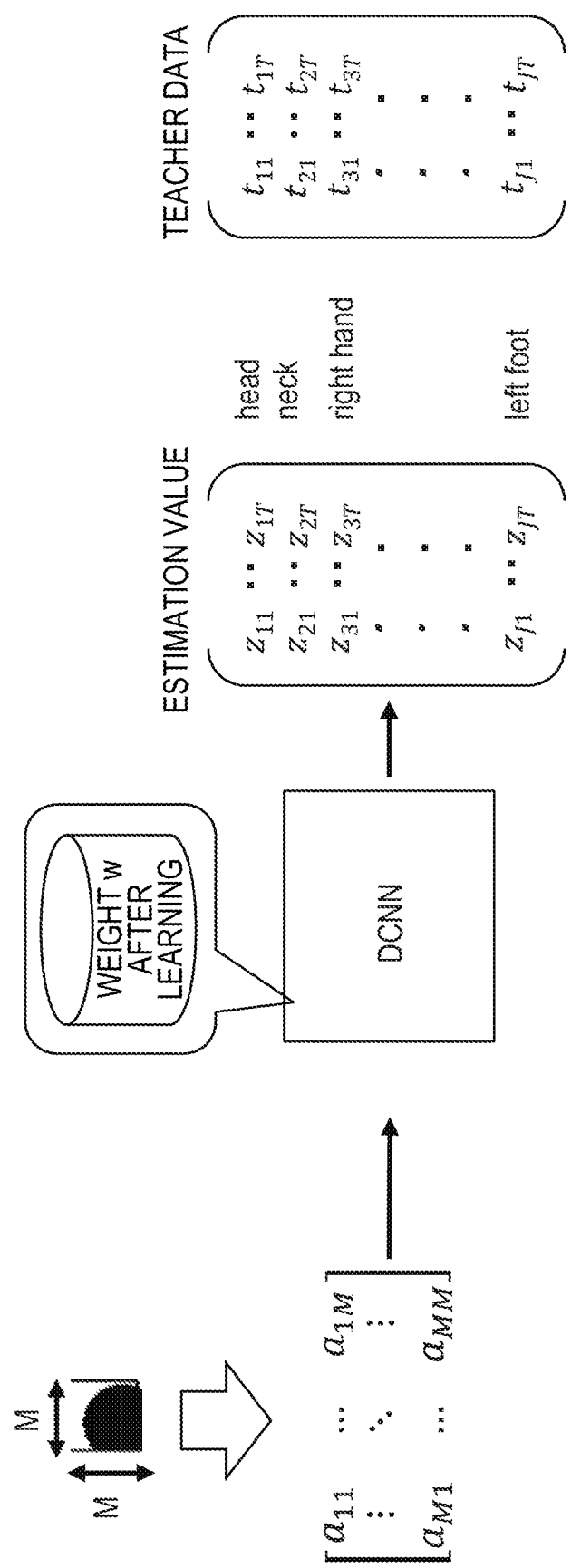
FIG. 12 is a diagram illustrating DCNN processing.

FIG. 12 is a diagram illustrating DCNN processing.

When a DCNN is used, the joint recognizing unit 131 constructs a DCNN. A user prepares teacher data $t_{nm}$, and the joint recognizing unit 131 performs learning using training data, teacher data $t_{nm}$, and estimation values $z_{nm}$ output from the DCNN corresponding to each joint and each two-dimensional joint type, and performs weight w update of the DCNN. In the description, n=1 to J (J is the number of joints), and m=1 to T (T is the number of joint types). The weight w after learning is stored in a storage (not illustrated), and the joint recognizing unit 131 reads and uses the weight w when the joint recognizing unit 131 processes an input image using the DCNN.

The joint recognizing unit 131 inputs blocks obtained by dividing the input image to the DCNN as a two-dimensional array, and the DCNN outputs the probabilities $z_{nm}$ for each block as outputs. Each of the probabilities $z_{nm}$ indicates a possibility that the block is of a corresponding type of a corresponding joint.

Figure 13:
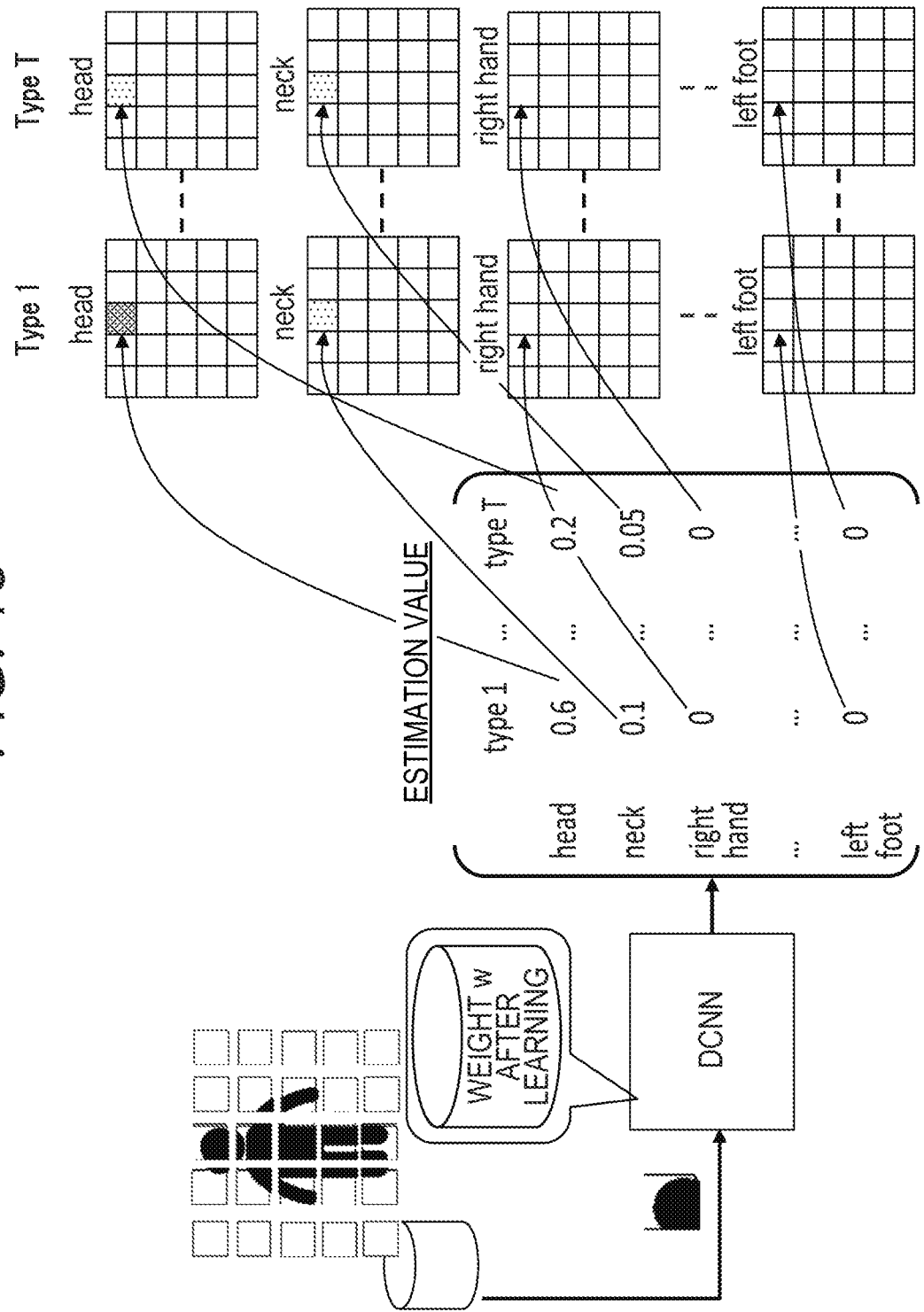
FIG. 13 is a diagram illustrating DCNN processing performed by the joint recognizing unit.

FIG. 13 is a diagram illustrating the DCNN processing performed by the joint recognizing unit.

The joint recognizing unit 131 divides the input image (color image 201) into a plurality of images (blocks) each including M pixels in the horizontal direction and M pixels in the vertical direction. The joint recognizing unit 131 processes the blocks obtained by dividing the image one by one using the DCNN. It is assumed that the learning of the weight w for the DCNN has been completed.

The joint recognizing unit 131 reads the weight w stored in the storage (not illustrated), and calculates an estimation value for the target block with respect to each joint and each type using the DCNN using the input block and the weight w. The calculated estimation value corresponds to the joint position probability distribution $\phi_{RGB}$. For example, when a block is input, an estimation value of the block for each type of each joint is obtained. Assuming that a certain block is input and 0.6 is obtained as the estimation value for joint=head and type T=1, it indicates that the probability that a head of type T=1 is present in the block is 0.6. Thereafter, estimation values are calculated similarly for other blocks.

The above-described method of calculating the estimation value by the joint recognizing unit 131 is merely an example, and it is not limited to template matching or a DCNN.

Next, the joint relative position score $\psi_{RGB}$ calculated by the joint relative position score calculating unit 151 will be described.

Figure 14:
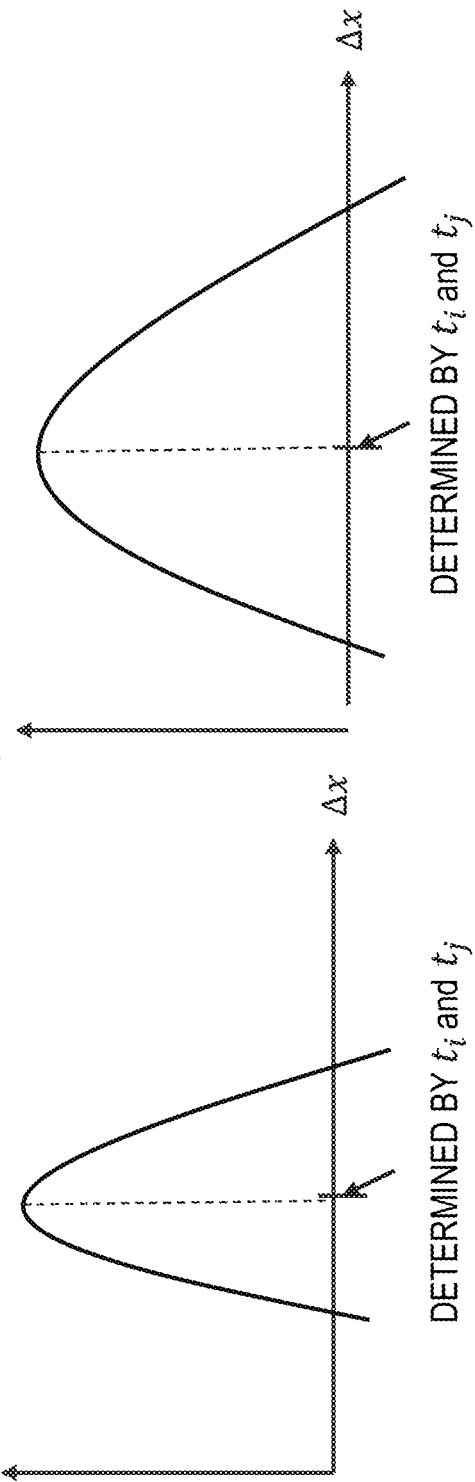
FIG. 14 is a diagram illustrating a joint relative position score function that is suitable to two-dimensional patterns.

FIG. 14 is a diagram illustrating a joint relative position score function that is suitable to two-dimensional joint type patterns.

A user defines a function (joint relative position score function) that outputs a value which becomes larger when the relative position of the joint i, j matches the joint type $t_i$, $t_j$, and the joint relative position score calculating unit 151 calculates the relative position score $\psi_{RGB}$ in each area of the two-dimensional plane for each joint of each two-dimensional joint type using the defined joint relative position score function.

The joint relative position score function $\psi$ may be defined as $\psi(x_i, y_i, x_j, y_j, t_i, t_j)=f_{titj}(\Delta x, \Delta y)$. The variations $x_i$, and $y_i$ are the coordinates of the joint i, and the variation $t_i$ is a two-dimensional joint type of the joint i. The variations $x_j$ and $y_j$ are the coordinates of the joint j, and the variation $t_j$ is a two-dimensional joint type of the joint j. The variations $\Delta x$ and $\Delta y$ are the differences between the coordinates of the joints i and j, and thus are expressed as $\Delta x=x_i-x_j$, and $\Delta y=y_i-y_j$.

The lower part of FIG. 14 illustrates the joint relative position score function $f_{titj}(\Delta x, \Delta y)$, and the variables $\Delta x$ and $\Delta y$ that make the joint relative position score function $f_{titj}(\Delta x, \Delta y)$ maximum are determined by $t_i$ and $t_j$.

Figure 15:
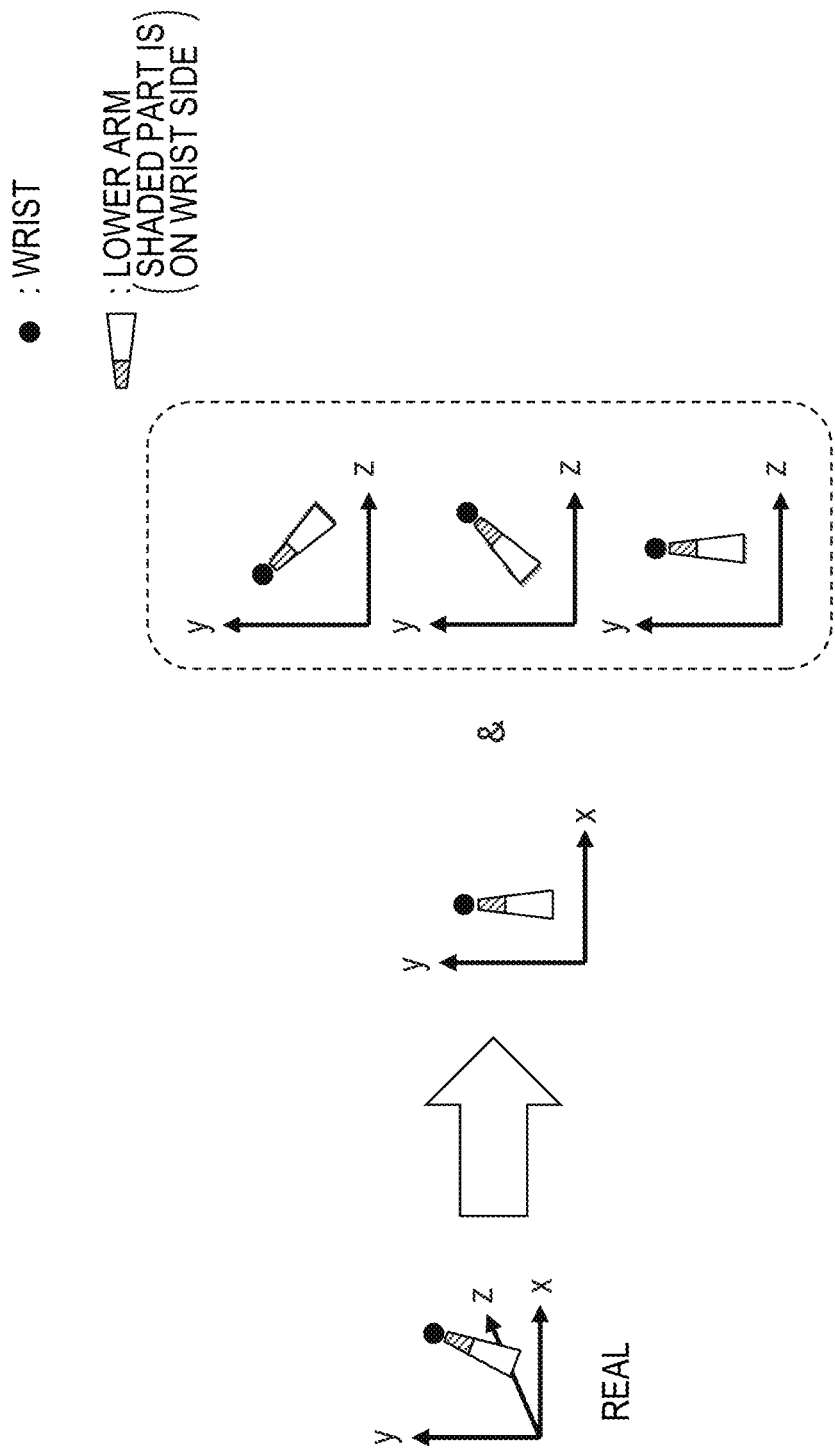
FIG. 15 is a diagram for describing three-dimensional joint types.

FIG. 15 is a diagram for describing three-dimensional joint types.

In the above description, the joint type is determined based on the positional relationship of the joints i, j in two dimensions, and is used by the joint recognizing unit 131 and the joint relative position score calculating unit 151. In the following description, joints are classified into types using a depth in the z direction in addition to the positional relationship in the x-y plane.

Type classification is performed by using appearance (positional relationship) of a joint in the y-z plane in addition to appearance of the joint in the x-y plane. The three-dimensional joint type is used by the joint recognizing unit 141 and the joint relative position score calculating unit 161.

FIG. 16 is a diagram illustrating a three-dimensional joint type pattern.

The three-dimensional joint types are obtained by classifying, depending on the relative position ($x_{ij}$, $y_{ij}$, $z_{ij}$) of the joint i and a joint j adjacent to the joint i on the image, appearance of the joint i into T' number of types.

When the coordinates of the joint i are defined as $(x_i, y_i, z_i)$ and the coordinates of joint j are defined as $(x_j, y_j, z_j)$, the relative position $(x_{ij}, y_{ij}, z_{ij})$ is expressed as $(x_{ij}, y_{ij}, z_{ij}) = (x_i - x_j, y_i - y_j, z_i - z_j)$.

The number of types T' and type classification (pattern) are determined by a user. For example, in the case of T'=8, type classification like the pattern illustrated in FIG. 16 is used.

For example, a joint i having $x_{ij}$, $y_{ij}$, and $z_{ij}$ that are all positive values is classified into type 1.

Figure 17:
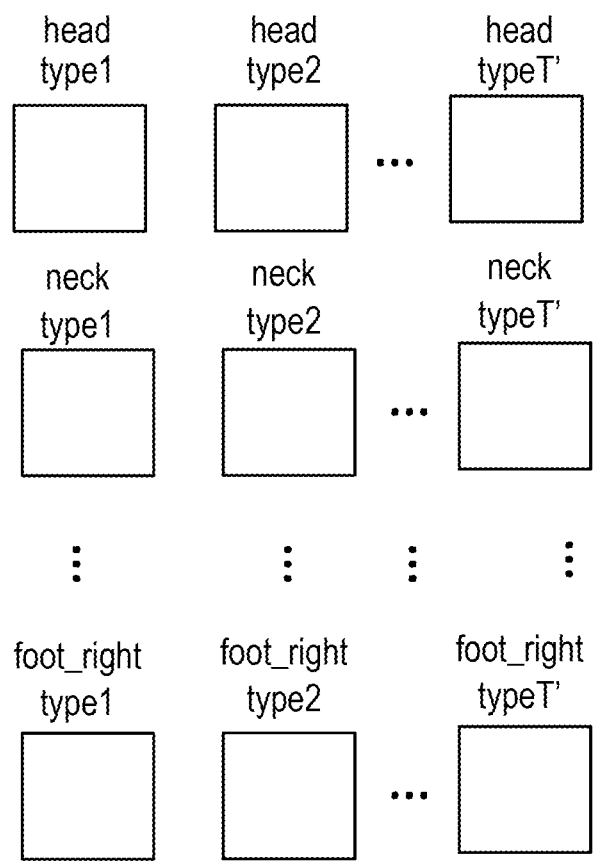
FIG. 17 is a diagram illustrating joint position probability distribution Depth indicating estimation values of joint types of joints.

FIG. 17 is a diagram illustrating joint position probability distribution $\phi_{Depth}$ indicating estimation values of joint types of joints.

The joint recognizing unit 141 uses the depth image 211 instead of the color image 201 and uses the template matching or a DCNN similarly to the joint recognizing unit 131 to calculate the estimation values and generate the joint position probability distribution $\phi_{Depth}$.

In addition, the joint recognizing unit 141 uses three-dimensional joint types as illustrated in FIG. 16.

When the joint recognizing unit 141 performs template matching, a user prepares T' templates for one joint, where T' is the number of three-dimensional joint types. A template of a joint type of a certain joint is an image illustrating the joint corresponding to the three-dimensional joint type.

The joint recognizing unit 141 divides the input image (depth image 211) into a plurality of images (blocks) each including M pixels in the horizontal direction and M pixels in the vertical direction. The joint recognizing unit 141 processes blocks obtained by dividing an image one by one using the template matching.

The joint recognizing unit 141 reads a plurality of templates for all types of all joints stored in a storage (not illustrated), performs template matching using the input block and the plurality of templates, and calculates an estimation value of the block with respect to each joint and each type. The calculated estimation value corresponds to the joint position probability distribution $\phi_{Depth}$.

When a DCNN is used by the joint recognizing unit 141, the joint recognizing unit 141 constructs a DCNN. A user prepares training data and teacher data $t_{nm}$ corresponding to each joint and each three-dimensional joint type, and the joint recognizing unit 131 performs learning using training data, teacher data $t_{nm}$, and estimation values $z_{nm}$ output from the DCNN, and performs weight w update of the DCNN. In the description, n=1 to J (J is the number of joints), m=1 to T' (T' is the number of three-dimensional joint types). The weight w after learning is stored in a storage (not illustrated), and the joint recognizing unit 131 reads and uses the weight w when the joint recognizing unit 131 processes an input image using the DCNN.

The joint recognizing unit 141 inputs blocks obtained by dividing the input image to the DCNN as a two-dimensional array, and the DCNN outputs the probabilities $z_{nm}$ that each block is respective types of respective joints as outputs.

The joint recognizing unit 141 divides the input image (depth image 211) into a plurality of images (blocks) each including M pixels in the horizontal direction and M pixels in the vertical direction. The joint recognizing unit 141 processes the blocks obtained by dividing the image one by one using the DCNN. It is assumed that the learning of the weight w for the DCNN has been completed.

The joint recognizing unit 141 reads the weight w stored in the storage (not illustrated), and calculates an estimation value for the target block with respect to each joint and each type using the DCNN using the input block and the weight w. The calculated estimation value corresponds to the joint position probability distribution $\phi_{Depth}$. For example, when a block is input, an estimation value of the block for each type of each joint is obtained. Assuming that a certain block is input and 0.6 is obtained as the estimation value for joint=head and type T'=1, it indicates that the probability that a head of type T'=1 is present in the block is 0.6. Thereafter, estimation values are calculated similarly for other blocks.

Next, the joint relative position score $\psi_{Depth}$ calculated by the joint relative position score calculating unit 161 will be described.

Figure 18:
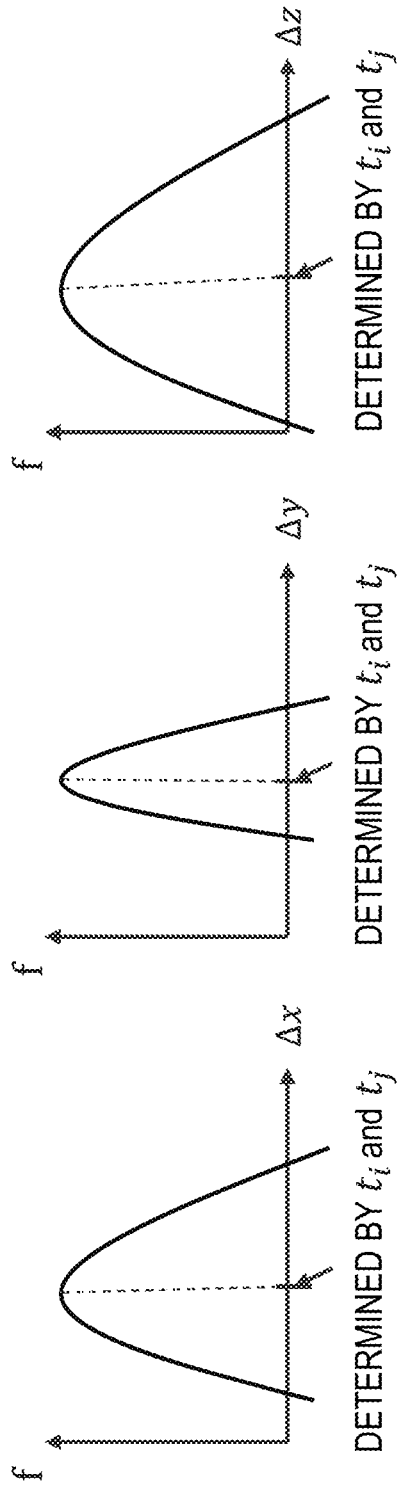
FIG. 18 is a diagram illustrating a joint relative position score function that is suitable to three-dimensional patterns.

FIG. 18 is a diagram illustrating a joint relative position score function that is suitable to three-dimensional joint type patterns.

A user defines a function (joint relative position score function) that outputs a value which becomes larger when the relative position of the joint i, j matches the joint type $t_i$, $t_j$, and the joint relative position score calculating unit 161 calculates the relative position score $\psi_{Depth}$ in each area of the two-dimensional plane for each three-dimensional joint type using the defined joint relative position score function.

The joint relative position score function $\psi$ may be defined as $\psi_{Depth}(x_i, y_i, z_i, x_j, y_j, z_j, t_i, t_j) = f_{titj}(\Delta x, \Delta y, \Delta z)$. The variations $x_i$, $y_i$, and $z_i$ are the coordinates of the joint i, and the variation $t_i$ is a three-dimensional joint type of the joint i. The variations $x_j$, $y_j$, $z_j$ are the coordinates of the joint j, and the variation $t_j$ is a three-dimensional joint type of the joint j. The variations $\Delta x$, $\Delta y$, and $\Delta z$ are the differences between the coordinates of the joints i and j, and thus expressed as $\Delta x = x_i - x_j$, $\Delta y = y_i - y_j$, and $\Delta z = z_i - z_j$.

The lower part of FIG. 18 illustrates the joint relative position score function $f_{titj}(\Delta x, \Delta y, \Delta z)$, and the variables $\Delta x$, $\Delta y$, and $\Delta z$ that make the joint relative position score function $f_{titj}(\Delta x, \Delta y, \Delta z)$ maximum are determined by $t_i$, $t_j$.

Figure 19:
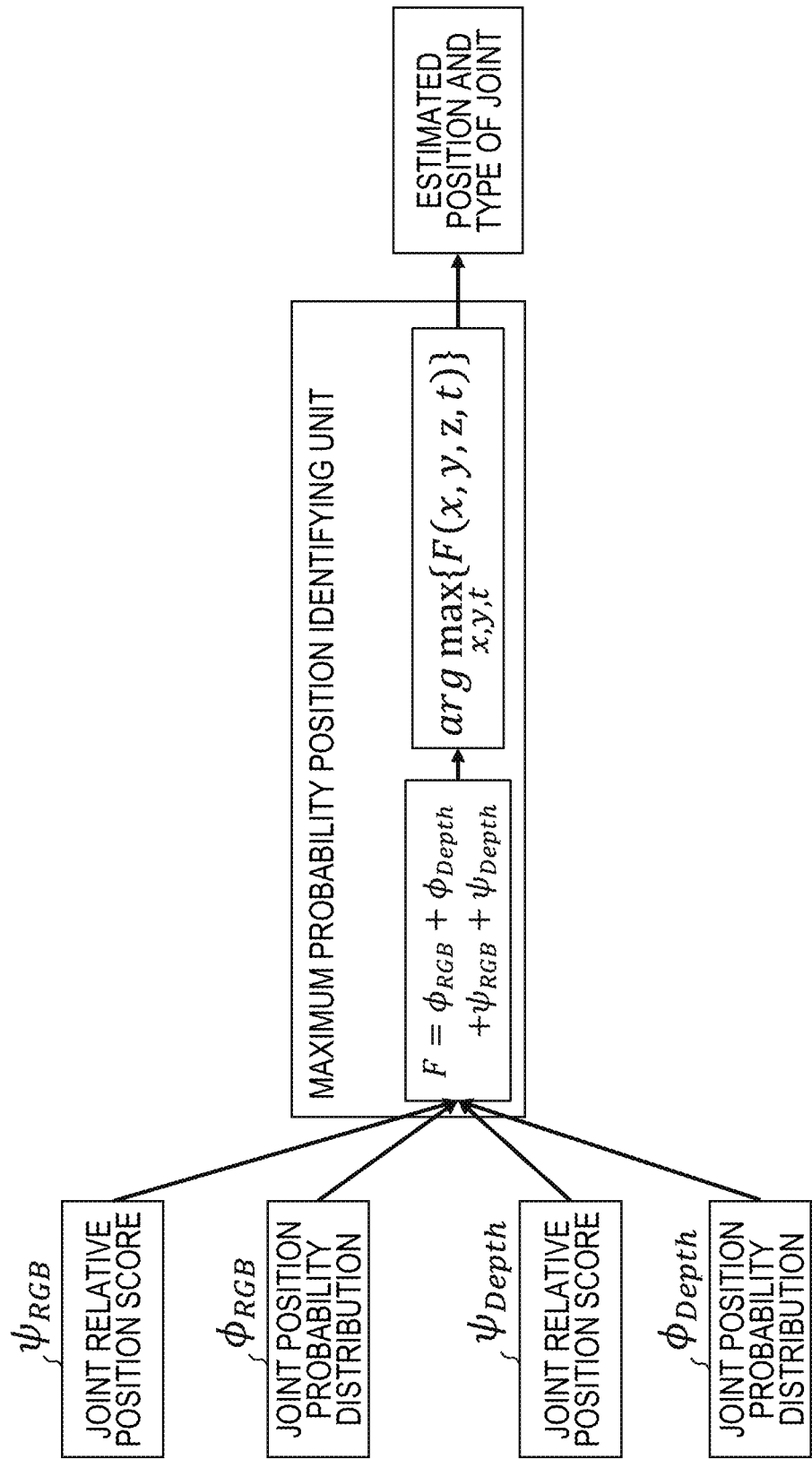
FIG. 19 is a diagram for describing the processing of a maximum probability position identifying unit.

FIG. 19 is a diagram for describing the processing of the maximum probability position identifying unit.

To the maximum probability position identifying unit 171, the joint relative position score $\psi_{RGB}$, the joint position probability distribution $\phi_{RGB}$, the joint relative position score $\psi_{Depth}$, and the joint position probability distribution $\phi_{Depth}$ are input. The maximum probability position identifying unit 171 calculates a score function F of Expression (1) below, which is sum of the joint relative position score $\psi_{RGB}$, the joint position probability distribution $\phi_{RGB}$, the joint relative position score $\psi_{Depth}$, and the joint position probability distribution $\phi_{Depth}$.

[Expression 1]

$$F(x, y, z, t) = \sum_{i \in joints} \phi_{RGB}(x_i, y_i, t_i^{RGB}) + \sum_{i,j \in parts} \psi_{RGB}(x_i, y_i, x_j, y_j, t_i^{RGB}, t_j^{RGB}) + \sum_{i \in joints} \phi_{Depth}(x_i, y_i, t_i^{Depth}) + \sum_{i,j \in parts} \psi_{Depth}(x_i, y_i, z_i, x_j, y_j, z_j, t_i^{Depth}, t_j^{Depth}) \quad (1)$$

The score function F is a function for calculating the probability that the actual joint is present when any joint type and coordinates are selected from the joint position probability distribution. In the functions $\phi_{RGB}$, $\phi_{Depth}$, $\psi_{RGB}$, and $\psi_{Depth}$, the variables $x_i$, $x_j$, $y_i$, and $y_j$ are common. The variables $t_i^{RGB}$ and $t_i^{Depth}$ are independent. In the expression i∈ joints, i indicates a joint, and the expression i, j∈ parts indicates a combination of adjacent joints.

The maximum probability position identifying unit 171 uses the max-sum method, the Expectation Maximization (EM) method, the Monte Carlo method, or the Genetic Algorithm (GA) to identify a position where the score function F (x, y, z, t) is maximized. The maximum probability position identifying unit 171 outputs the position coordinates and the joint type of each joint that are identified as an estimation result.

Next, the posture estimation processing using the max-sum method in identifying the maximum probability position will be described.

Figure 20:
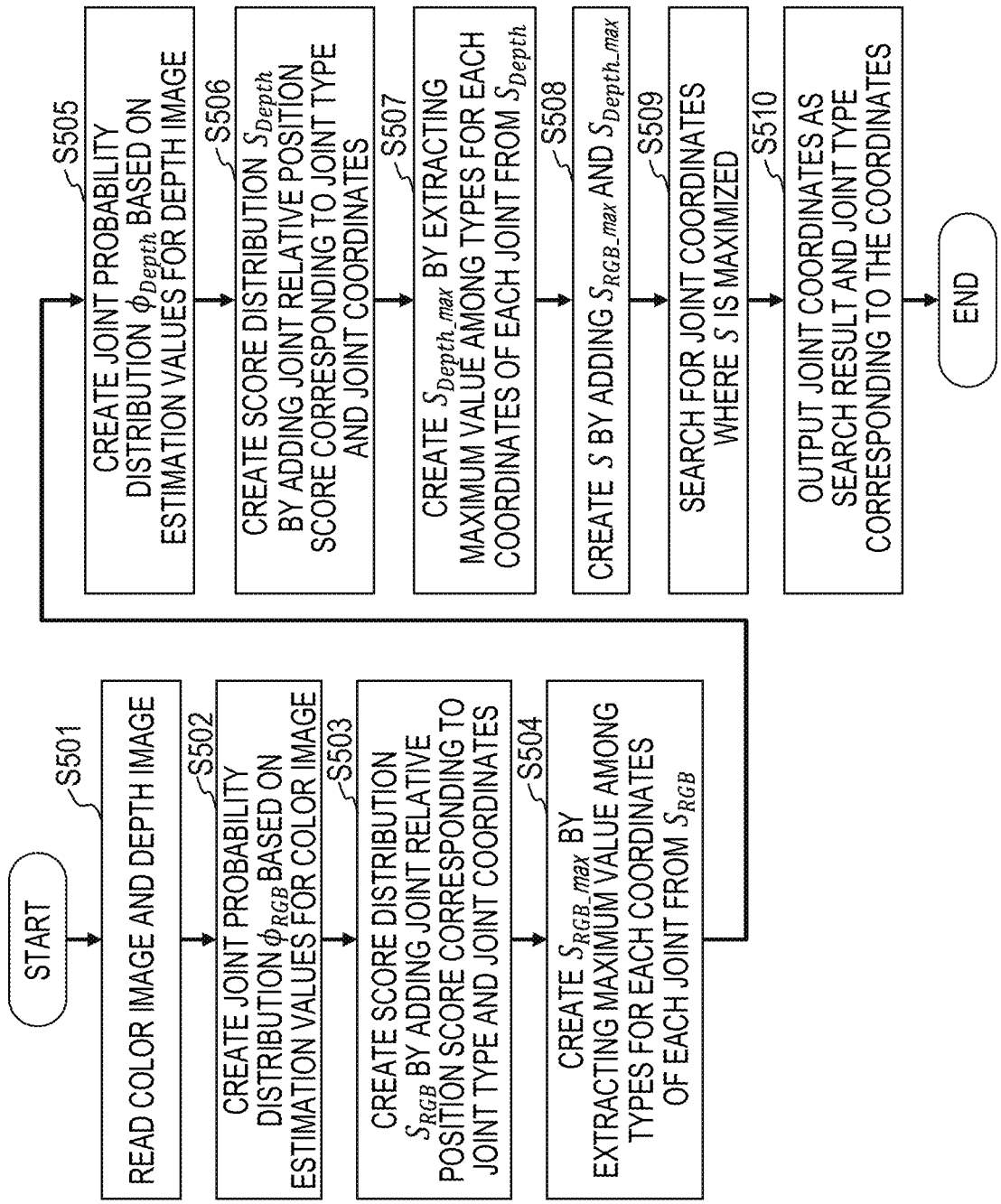
FIG. 20 is a flowchart of the posture estimation processing using the max-sum method according to the embodiment.

FIG. 20 is a flowchart of the posture estimation processing using the max-sum method according to the embodiment.

Figure 21:
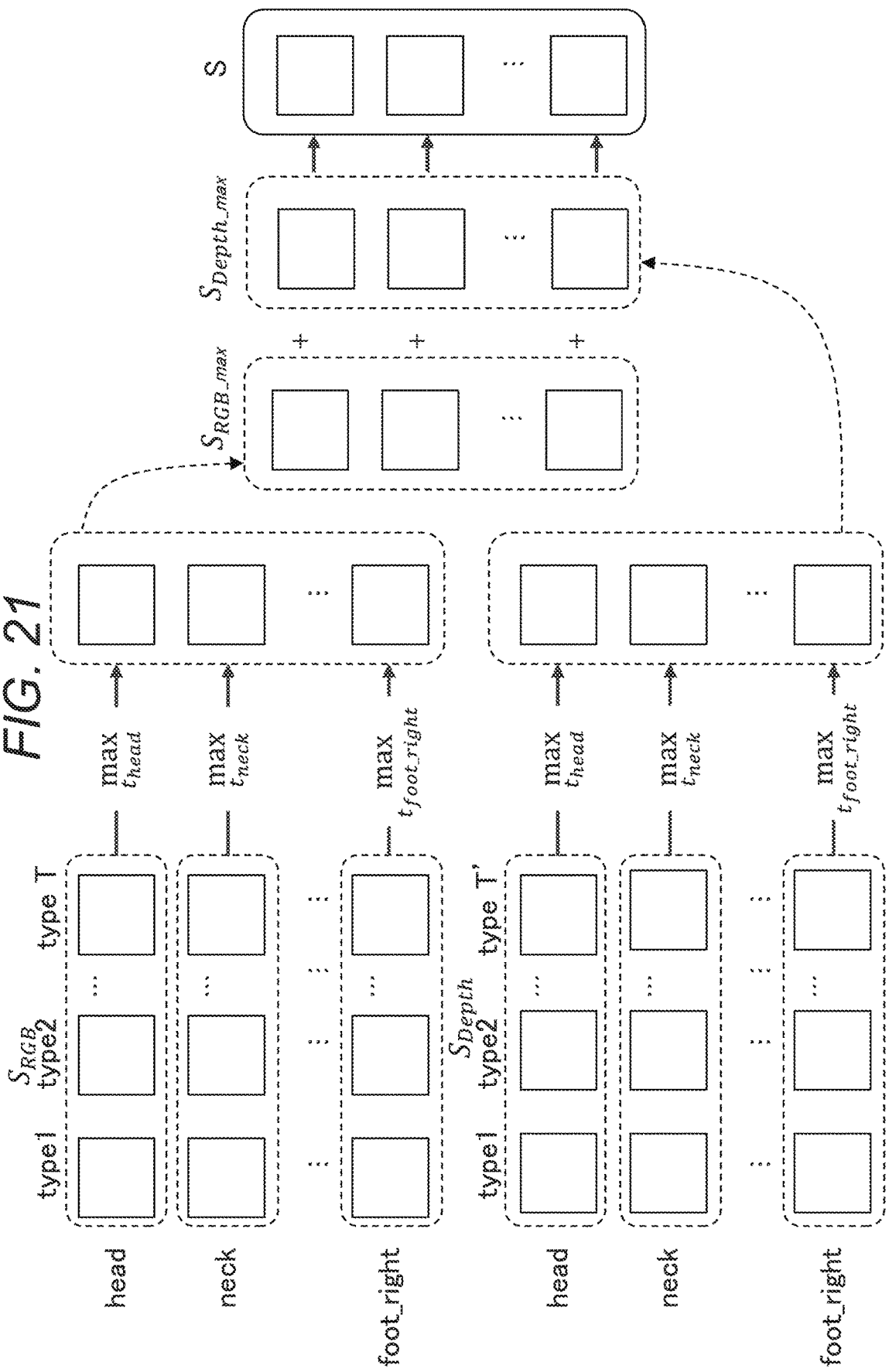
FIG. 21 is a diagram for describing the posture estimation processing using the max-sum method according to the embodiment.

FIG. 21 is a diagram for describing the posture estimation processing using the max-sum method according to the embodiment.

In step S501, the camera 111 captures an image and outputs the color image 201, and the color image 201 is input to the joint recognizing unit 131. In addition, the camera 121 captures an image and outputs the depth image 211, and the depth image 211 is input to the joint recognizing unit 141.

In step S502, the joint recognizing unit 131 divides the color image 201, calculates an estimation value for each of the blocks obtained by the division with respect to each two-dimensional joint type of each joint, creates a joint probability distribution $\phi_{RGB}$, and outputs the joint probability distribution $\phi_{RGB}$ to the maximum probability position identifying unit 171.

In step S503, the maximum probability position identifying unit 171 adds the joint relative position score $\psi_{RGB}$ of each coordinates (block) of each joint of each two-dimensional joint type to the corresponding joint probability distribution $\phi_{RGB}$ to create a score distribution $S_{RGB}$. The joint relative position score $\psi_{RGB}$ may be calculated in advance by the joint relative position score calculating unit 151 or may be calculated in step S503.

In step S504, the maximum probability position identifying unit 171 extracts the maximum value among the joint types for each coordinates of each joint from the score distribution $S_{RGB}$ to create a score distribution $S_{RGB\_max}$. At this time, the joint type of the extracted maximum value for creating the score distribution $S_{RGB\_max}$ is memorized.

In step S505, the joint recognizing unit 141 divides the depth image 211, calculates an estimation value for each of the blocks obtained by the division with respect to each type of joint, creates a joint probability distribution $\phi_{Depth}$, and outputs the joint probability distribution $\phi_{Depth}$ to the maximum probability position identifying unit 171.

In step S506, the maximum probability position identifying unit 171 adds the joint relative position score $\psi_{Depth}$ of each coordinates of each joint of each three-dimensional joint type to the corresponding joint probability distribution $\phi_{Depth}$ to create a score distribution $S_{Depth}$. The joint relative position score $\psi_{Depth}$ may be calculated in advance by the joint relative position score calculating unit 161 or may be calculated in step S506.

In step S507, the maximum probability position identifying unit 171 extracts the maximum value among the joint types for each coordinates of each joint from the score distribution $S_{Depth}$ to create a score distribution $S_{Depth\_max}$. At this time, the joint type of the extracted maximum value for creating the score distribution $S_{Depth\_max}$ is memorized.

In step S508, the maximum probability position identifying unit 171 adds the score distribution $S_{RGB\_max}$ and the score distribution $S_{Depth\_max}$ to create a score distribution S.

In step S509, the maximum probability position identifying unit 171 searches for the coordinates where the score distribution S of each joint is maximized. The maximum probability position identifying unit 171 finds coordinates where the estimation value is the maximum for each joint.

In step S510, the maximum probability position identifying unit 171 outputs the coordinates, which are the search result, and the three-dimensional joint type corresponding to the coordinates for each joint. In addition, the angles of each joint in the x-y plane and the y-z plane corresponding to each of the three-dimensional joint types may be stored in the storage (not illustrated), and the maximum probability position identifying unit 171 may output the angles (the posture of a part coupled to the joint) corresponding to the joint type corresponding to the joint coordinates, which are the search results, as an estimation result.

Figure 22:
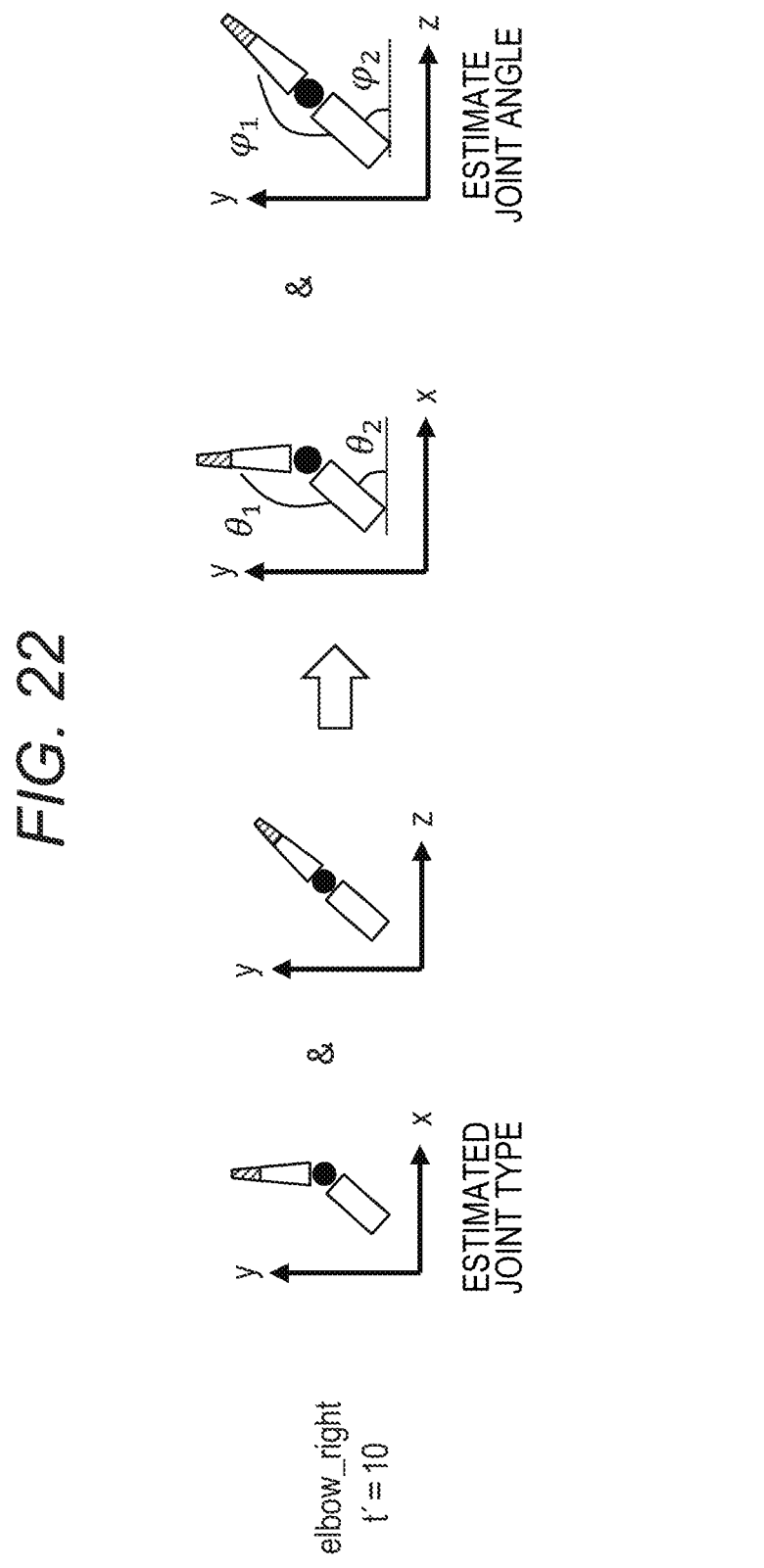
FIG. 22 is a diagram illustrating the estimated joint type and the angle of the part coupled to the joint.

FIG. 22 is a diagram illustrating the estimated joint type and the angle of the part coupled to the joint.

For example, it is assumed that t'=10 is output as the joint type of the right elbow by the posture estimation method. As described above, the joint types are classes of joints depending on the positional relationship between the joint i and the joint j adjacent to the joint i. Therefore, when the joint type of the joint i is known, the positional relationship between the joint i and the joint j adjacent to the joint i can also be known, and the angle (posture) of the part coupling the joint i and the joint j can also be known. Therefore, for example, if the joint type t' of the right elbow is estimated, the positional relationship between the right elbow and the right shoulder connected via the upper arm can also be known. Thus, the angle (posture) of the upper arm is also known. In addition, when the joint type of the right hand is known, the positional relationship between the right hand and the right elbow coupled via the lower arm can also be known. Thus, the angle (posture) of the lower arm is also known and the angle formed by the upper arm and the lower arm (the angle of the elbow) is also known.

According to the posture estimating device of the embodiment, it is possible to estimate the position of a joint and the posture of a part coupled to the joint.

Figure 23:
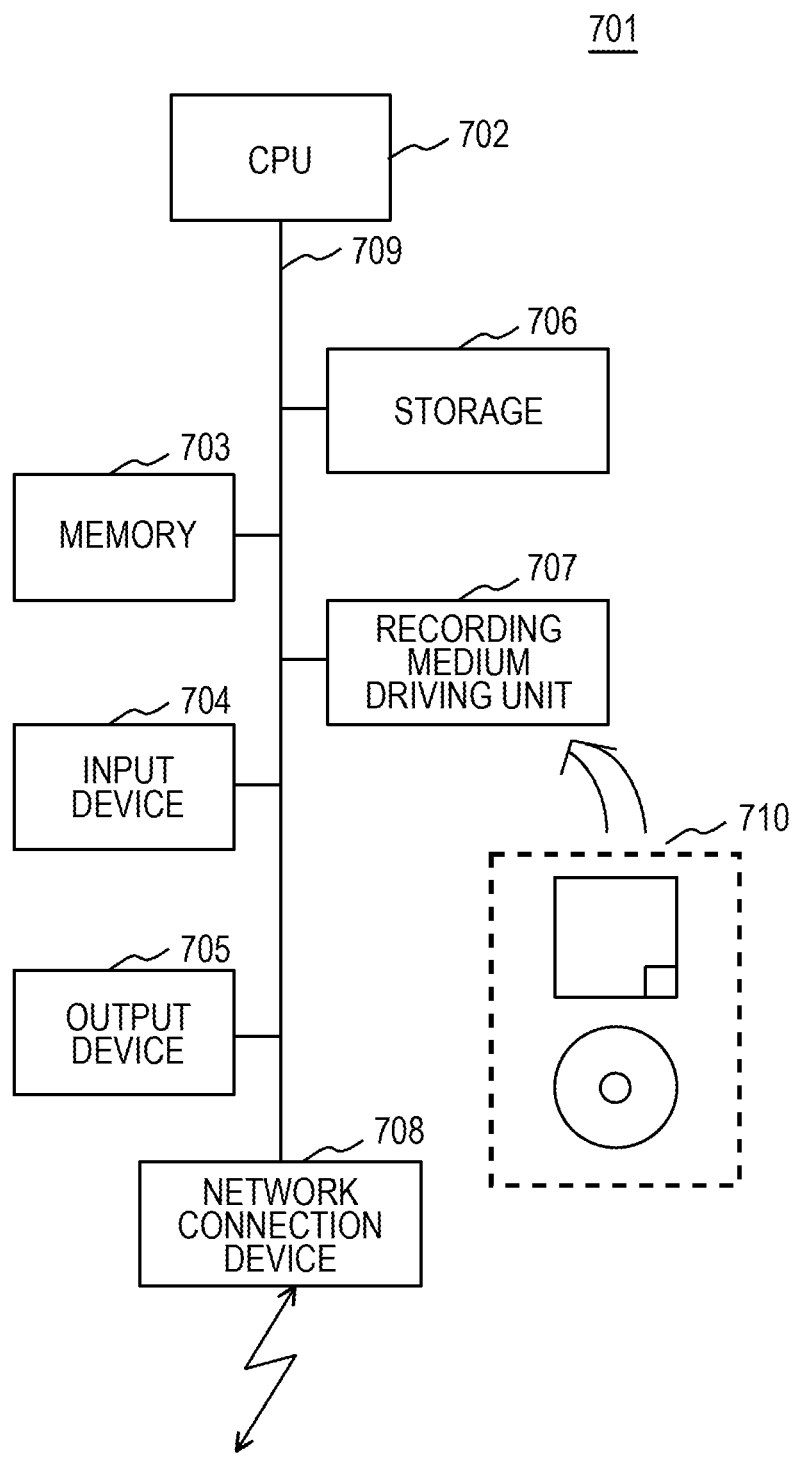
FIG. 23 is a configuration diagram of an information processing device (computer).

FIG. 23 is a configuration diagram of the information processing device (computer).

The posture estimating device 101 according to the embodiment can be realized by an information processing device (computer) 701 as illustrated in FIG. 23, for example.

The information processing device 701 includes a CPU 702, a memory 703, an input device 704, an output device 705, a storage 706, a recording medium driving unit 707, and a network connection device 708, which are coupled to each other by a bus 709.

The CPU 702 is a central processing unit that controls the entire information processing device 1. The CPU 702 operates as the joint recognizing units 131 and 141, the joint relative position score calculating units 151 and 161, and the maximum probability position identifying unit 171.

The memory 703 is a memory such as a Read Only Memory (ROM) or a Random Access Memory (RAM) that temporarily stores a program or data stored in the storage 706 (or the portable recording medium 710). The CPU 702 performs the various types of processing as described above by executing the program using the memory 3.

In this case, the program code read from the portable recording medium 710 or the like itself realizes the function of the embodiment.

The input device 704 is used to input instructions and information from a user or an operator, to acquire data used in the information processing device 701, and for other purposes. The input device 704 is, for example, a keyboard, a mouse, a touch panel, a camera, a sensor, or the like. The input device 704 corresponds to the camera 111 and the depth camera 121.

The output device 705 operates under the control by the CPU 702, and, for example, outputs an inquiry or processing result to a user or an operator. The output device 705 is, for example, a display, a printer, or the like.

The storage 706 is, for example, a magnetic disk device, an optical disk device, a tape device, or the like. The information processing device 701 stores the above-described program and data in the storage 706, loads them into the memory 703, and uses them as needed.

The recording medium driving unit 707 drives the portable recording medium 710 and accesses the recorded contents. As the portable recording medium, any computer-readable recording medium such as a memory card, a flexible disk, a Compact Disk Read Only Memory (CD-ROM), an optical disk, a magneto optical disk or the like may be used. A user stores the above-described program and data in the portable recording medium 710, loads them into the memory 703, and uses them as needed.

The network connection device 708 is a communication interface that is connected to any communication network such as a Local Area Network(LAN), Wide Area Network (WAN), or the like and that performs data conversion accompanying communication. The network connection device 708 transmits data to a device coupled through a communication network and receives data from a device coupled through a communication network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
estimate a first position of a first joint in a two-dimensional plane based on a color image, and estimate a first positional relationship between the first joint and a second joint coupled to the first joint via a portion in the two-dimensional plane;
estimate a second position of the first joint in the two-dimensional plane based on a depth image indicating respective depths of the first joint and the second joint, and estimate a second positional relationship between the first joint and the second joint in a three-dimensional space; and
estimate a third position of the first joint in the two-dimensional plane and posture of the portion in the three-dimensional space based on the first position, the first positional relationship the second position, and the second positional relationship.

2. The information processing device according to claim 1 further comprising a storage configured to store a plurality of pieces of template information corresponding to a plurality of positional relationships between the first joint and the second joint in the three-dimensional space with respect to the first joint, wherein the processor is configured to estimate the second positional relationship by performing template matching using the depth image and the plurality of pieces of template information.

3. The information processing device according to claim 1, wherein the processor is configured to estimate the second positional relationship by causing a neural network to learn information indicating a plurality of positional relationships between the first joint and the second joint in the three-dimensional space with respect to the first joint, and inputting the depth image to the neural network that has learned the information.

4. An information processing method comprising:
estimating, by a computer, a first position of a first joint in a two-dimensional plane based on a color image, and estimating a first positional relationship between the first joint and a second joint coupled to the first joint via a portion in the two-dimensional plane;
estimating a second position of the first joint in the two-dimensional plane based on a depth image indicating respective depths of the first joint and the second joint, and estimating a second positional relationship between the first joint and the second joint in a three-dimensional space; and
estimating a third position of the first joint in the two-dimensional plane and posture of the portion in the three-dimensional space based on the first position, the first positional relationship, the second position, and the second positional relationship.

5. The information processing method according to claim 4,
wherein the information processing device includes a storage configured to store a plurality of pieces of template information corresponding to a plurality of positional relationships between the first joint and the second joint in the three-dimensional space with respect to the first joint, and
wherein in the estimating the second positional relationship, the second positional relationship is estimated by performing template matching using the depth image and the plurality of pieces of template information.

6. The information processing method according to claim 4 further comprising causing a neural network to learn information indicating a plurality of positional relationships between the first joint and the second joint in the three-dimensional space with respect to the first joint,
wherein in the estimating the second positional relationship, the depth image is input to the neural network that has learned the information to estimate the second positional relationship.

7. A non-transitory computer-readable recording medium having stored therein a program for causing a computer to execute a process comprising:
estimating a first position of a first joint in a two-dimensional plane based on a color image, and estimating a first positional relationship between the first joint and a second joint coupled to the first joint via a portion in the two-dimensional plane;
estimating a second position of the first joint in the two-dimensional plane based on a depth image indicating respective depths of the first joint and the second joint, and estimating a second positional relationship between the first joint and the second joint in a three-dimensional space; and
estimating a third position of the first joint in the two-dimensional plane and posture of the portion in the three-dimensional space based on the first position, the first positional relationship, the second position, and the second positional relationship.

8. The non-transitory computer-readable recording medium according to claim 7,
wherein the information processing device includes a storage configured to store a plurality of pieces of template information corresponding to a plurality of positional relationships between the first joint and the second joint in the three-dimensional space with respect to the first joint, and
wherein in the estimating the second positional relationship, the second positional relationship is estimated by performing template matching using the depth image and the plurality of pieces of template information.

9. The non-transitory computer-readable recording medium according to claim 7 further comprising causing a neural network to learn information indicating a plurality of positional relationships between the first joint and the second joint in the three-dimensional space with respect to the first joint,
wherein in the estimating the second positional relationship, the depth image is input to the neural network that has learned the information to estimate the second positional relationship.

* * * * *